Patented June 20, 1933

1,914,427

UNITED STATES PATENT OFFICE

HANS HEYNA, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

ORANGE TO REDDISH-ORANGE WATER INSOLUBLE AZO DYESTUFFS

No Drawing. Application filed June 19, 1930, Serial No. 462,414, and in Germany July 8, 1929.

The present invention relates to orange to reddish-orange water insoluble azo dyestuffs.

I have found that dyestuffs of great tinctorial power, good fastness to light and to exposure and yielding orange to reddish-orange tints are obtainable by coupling with a 2.3-hydroxy-naphthoylarylamide the diazo compounds of the products having the following formula:

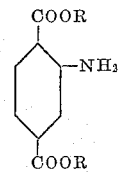

wherein R stands for alkyl, aralkyl or aryl.

The shades are varying from orange to reddish-orange according to the selection of the components.

The dyestuffs obtainable according to the present invention correspond with the following formula:

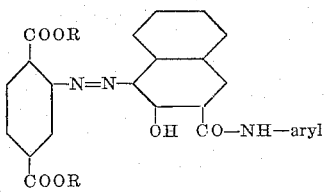

wherein R stands for alkyl, aralkyl or aryl.

The following examples illustrate the invention, but they are not intended to limit it thereto.

(1) Grounding liquor 6 grams of 2.3-hydroxynaphthoic-acid-2'-methoxy-1'-anilide, 12 ccm of Turkey red oil of 50 per cent strength and 10 ccm of caustic soda solution of 34° Bé. are stirred into a paste and dissolved by means of boiling water. After cooling 6 ccm of formaldehyde of 30 per cent strength are added and the whole is made up with water to 1 liter.

Dyebath 2.1 grams of aminoterephthalic acid dimethylester and 3.5 ccm of hydrochloric acid of 22° Bé. are stirred into a paste with a small quantity of warm water and diazotized in the cold with 7.5 ccm of a solution of sodium nitrite of 10 per cent strength. After the diazotization is complete, the whole is made up with water to 800–900 ccm and the diazo solution is neutralized with 2 grams of sodium acetate. 25 grams of sodium chloride are added and the whole is made up to 1 liter.

The material is washed and soaped at the boil and there is obtained a clear reddish-orange dyeing of excellent fastness to light and to exposure.

The new dyestuff has the following formula:

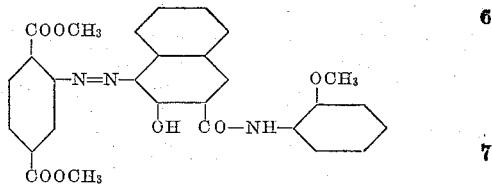

(2) Grounding liquor 3.5 grams of 2.3-hydroxynaphthoic-acid-2'-methoxy-4'-chloro-1'-anilide, 7 ccm of Turkey red oil of 50 per cent strength and 7 ccm of caustic soda solution of 34° Bé. are stirred into a paste and dissolved in 150–175 ccm of boiling water. After cooling, 3.5 ccm of formaldehyde of 30 per cent strength are added and the whole is made up with water to 1 liter.

Dyebath—The same as in Example 1

The material is washed and soaped at the boil and there is obtained a very clear orange dyeing of excellent fastness to light and to exposure.

The new dyestuff has the following formula:

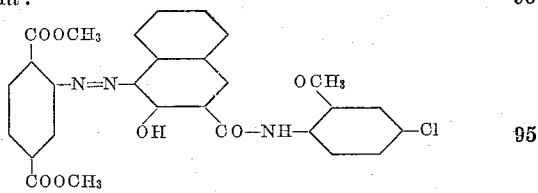

(3) Grounding liquor 4 grams of 2.3-hydroxynaphthoic-acid-2'-methyl-4'-chloro-1'-anilide, 8 ccm of Turkey red oil of 50 per cent strength and 8 ccm of caustic soda solution of 34° Bé. are stirred into a paste and dissolved by means of boiling water. After cooling 2 ccm of formaldehyde of 30 per cent strength are added and the whole is made up with water to 1 liter.

*Dyebath—The same as in Example 1*

The dyeing thus obtained only changes very little when soaped at the boil. It has a very vivid orange tint of good fastness to light and to exposure.

The new dyestuff has the following formula:

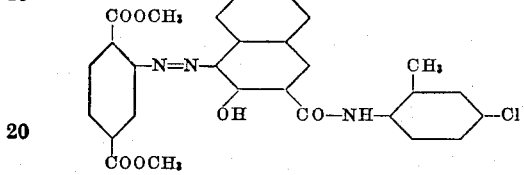

(4)

The cotton is padded with the following solution: 20 grams of 2.3-hydroxynaphthoic-acid-2'-ethoxy-1'-anilide, 30 grams of Turkey red oil of 50 per cent strength and 30 grams of caustic soda solution of 34° Bé. are stirred into a paste and the whole is made up with water to 1 liter.

As diazo solution there is used the following solution: 5.15 grams of aminoterephthalic-acid-dimethylester, 7 grams of hydrochloric acid of 22° Bé., 69 grams of water and ice and 19 grams of a sodium nitrite solution (1:10), the whole being made up to 100 grams.

The printing color consists of: 50 grams of tragacanth (65:1000), 40 grams of the above diazo solution and 10 grams of a sodium acetate solution (2:10).

The printing has a vivid, yellow orange tint which does not change when soaped and which has good fastness properties.

The new dyestuff has the following formula:

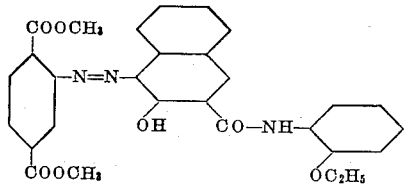

Since an object of the present invention is to provide dyestuffs of good fastness properties, which dyestuffs are insoluble in water and alkalies, it is to be understood that the aromatic nuclei of the general formulæ appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. As new products the compounds of the following general formula:

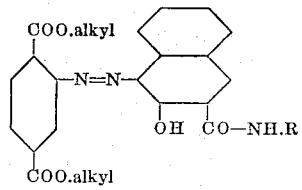

wherein R represents a residue of the benzene or naphthalene series, the said products having a great tinctorial power, good fastness to light and to exposure and yielding orange to reddish-orange tints.

2. As new products the compounds of the following general formula:

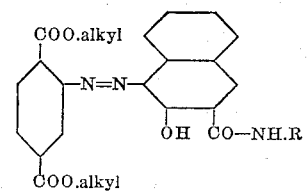

wherein R represents a benzene nucleus which may be substituted by alkyl, alkoxy or halogen, the said products having a great tinctorial power, good fastness to light and to exposure and yielding orange to reddish-orange tints.

3. As new products the compounds of the following general formula:

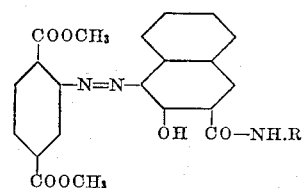

wherein R represents a benzene nucleus which may be substituted by alkyl, alkoxy or halogen, the said products having a great tinctorial power, good fastness to light and to exposure and yielding yellow-orange to reddish-orange tints.

4. As new products the compounds of the following general formula:

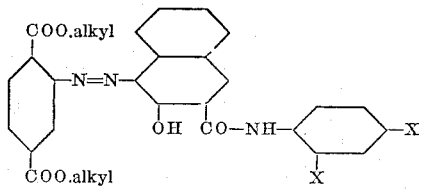

wherein one X stands for hydrogen or halogen and the other X for alkyl or alkoxy, the said products having a great tinctorial power, good fastness to light and to exposure and yielding yellow-orange to reddish-orange tints.

5. As new products the compounds of the following general formula:

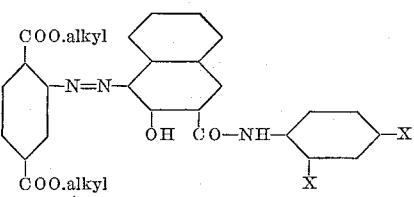

wherein one X stands for hydrogen or chlorine and the other X for methyl or methoxy, the said products having a great tinctorial power, good fastness to light and to exposure and yielding yellow-orange to reddish-orange tints.

6. As new products the compounds of the following general formula:

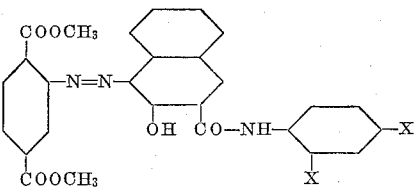

wherein one X stands for hydrogen or chlorine and the other X for methyl or methoxy, the said products having a good tinctorial power, good fastness to light and to exposure and yielding yellow-orange to reddish-orange tints.

7. As a new product the compound of the following formula:

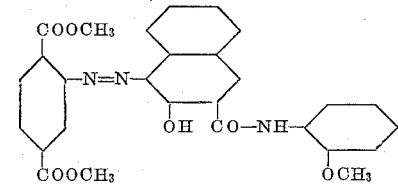

the said product having a great tinctorial power, a good fastness to light and to exposure and yielding a reddish-orange tint.

8. As a new product, the compound of the following formula:

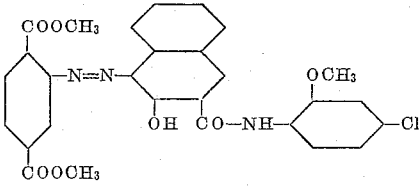

the said product having a great tinctorial power, an excellent fastness to light and to exposure and yielding a very clear orange tint.

9. Fiber dyed with the dyestuffs as claimed in claim 1.
10. Fiber dyed with the dyestuffs as claimed in claim 2.
11. Fiber dyed with the dyestuffs as claimed in claim 3.
12. Fiber dyed with the dyestuffs as claimed in claim 4.
13. Fiber dyed with the dyestuffs as claimed in claim 5.
14. Fiber dyed with the dyestuffs as claimed in claim 6.
15. Fiber dyed with the dyestuff as claimed in claim 7.
16. Fiber dyed with the dyestuff as claimed in claim 8.

In testimony whereof, I affix my signature.

HANS HEYNA.